(12) United States Patent
Wen

(10) Patent No.: US 6,394,121 B1
(45) Date of Patent: May 28, 2002

(54) CONNECTOR FOR PROHIBITING GAS FROM FLOWING BACK

(75) Inventor: Jeffrey Wen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/824,159

(22) Filed: Apr. 2, 2001

(30) Foreign Application Priority Data

Feb. 16, 2001 (TW) ......................................... 090103650

(51) Int. Cl.⁷ ................................................. F17D 1/04
(52) U.S. Cl. ................................ 137/2; 137/3; 137/602; 137/888
(58) Field of Search ................................ 137/602, 888, 137/889, 891, 892, 893, 894, 895, 896, 897, 898, 2, 3

(56) References Cited

U.S. PATENT DOCUMENTS

| | | | | |
|---|---|---|---|---|
| 2,105,056 A | * | 1/1938 | Sartell | |
| 2,727,535 A | * | 12/1955 | Linderoth | 137/803 |
| 3,735,778 A | * | 5/1973 | Garnier | 137/604 |
| 3,886,972 A | * | 6/1975 | Scott et al. | 137/13 |
| 4,765,373 A | * | 8/1988 | Munroe | 137/888 |
| 5,429,156 A | * | 7/1995 | Ueda et al. | 137/888 |
| 6,116,861 A | * | 9/2000 | Hogan et al. | 137/896 |

\* cited by examiner

*Primary Examiner*—Stephen M. Hepperle
(74) *Attorney, Agent, or Firm*—Niro, Scavone, Haller & Niro

(57) ABSTRACT

A connector for prohibiting a gas from flowing back is disclosed. The connector includes an outer housing having a gas inlet thereon; and an inner housing disposed inside the outer housing and having an annular concavity, corresponding to the gas inlet, thereon. The outer housing and the inner housing are funnel-shaped. The gas inlet is used for inputting an inert gas, and the annular concavity is used for dispersing the inputted inert gas.

16 Claims, 3 Drawing Sheets

CONNECTOR FOR PROHIBITING GAS FROM FLOWING BACK

FIELD OF THE INVENTION

The present invention is related to a connector, and more particularly to a connector for prohibiting a gas from flowing back.

BACKGROUND OF THE INVENTION

In a semiconductor manufacturing process, for complying with the manufacturing process parameters or discharging the incompletely reacted gases and the byproducts, the chamber of a chemical vapor deposition machine is generally controlled at a suitable pressure by a pump. For forming a tungsten plug adapted to make an electrical connection between two metal layers as an example, the tungsten hexafluoride gas, the carbon fluoride gas and the silane gas are continuously inputted into the chamber of a low pressure chemical vapor deposition machine. In the mean time, the incompletely reacted gases and the byproducts are continuously removed from the chamber and thereafter into a local scrubber machine to dispose the incompletely reacted gases and the byproducts through an exhaust pipe. Despite pumping of the chamber, it is still easy for the water contained inside the local scrubber machine to flow back and then react with the incompletely reacted gases and the byproducts such that the reacted products are deposited on the sidewall of the exhaust pipe in the end. Certainly, the reacted products formed on the sidewall of the exhaust pipe not only lower the sucking efficiency of the pump and thus influence the manufacturing stability for the low pressure chemical vapor deposition machine, but also result in increasing cleaning frequency of the exhaust pipe and thus lowing the throughputs of the semiconductor products.

Accordingly, it is attempted by the present applicant to overcome the above-described problems encountered in the prior arts.

SUMMARY OF THE INVENTION

An object of the present invention is to provide a connector for prohibiting a gas from flowing back.

Another object of the present invention is to provide a connector for lowing the cleaning frequency of an exhaust pipe connected to a chemical vapor deposition machine.

A further object of the present invention is to provide a connector for raising the throughputs of the semiconductor products.

According to an aspect of the present invention, a connector for prohibiting a gas from flowing back is provided. The connector includes an outer housing having a gas inlet thereon, and an inner housing disposed inside the outer housing and having an annular concavity, corresponding to the gas inlet, thereon.

Preferably, the gas inlet is used for inputting an inert gas.

Preferably, the inert gas is nitrogen gas.

Preferably, the annular concavity is used for dispersing the inputted inert gas.

Preferably, the outer housing and the inner housing are funnel-shaped.

Preferably, a gap formed between the outer housing and the inner housing is less than 0.2 mm.

Preferably, the inner housing further is composed of a main body and a center ring.

Preferably, the center ring is integrally formed with the main body.

Preferably, the center ring is connected with the main body by soldering.

According to another aspect of the present invention, a device for prohibiting a gas from flowing back is provided. The device includes a first pipe connected to a machine, a connector connected to the first pipe, and a second pipe connected to the connector, wherein the connector includes an outer housing having a gas inlet thereon, and an inner housing disposed inside the outer housing and having an annular concavity, corresponding to the gas inlet, thereon.

Preferably, the gas inlet is used for inputting an inert gas.

Preferably, the annular concavity is used for dispersing the inputted inert gas.

According to a further aspect of the present invention, a method of prohibiting a gas from flowing back, adapted to be used for a connector composed of an outer housing and an inner housing, is provided. The method includes steps of (a) inputting an inert gas into a gas inlet of the outer housing, (b) dispersing the inert gas in a gap formed between the outer housing and the inner housing by an annular concavity of the inner housing, and (c) discharging the inert gas from the gap for forming a gas fall at one end of the connector to prohibit the gas from flowing back.

Preferably, the inert gas is nitrogen gas.

Preferably, the outer housing and the inner housing are funnel-shaped.

Preferably, the gap formed between the outer housing and the inner housing is less than 0.2 mm.

The present invention may best be understood through the following description with reference to the accompanying drawings, in which:

BRIEF DESCRIPTION OF THE DRAWING

FIG. 1(*b*) is a schematic diagram showing the cross-sectional view of the inner housing of a connector according to the present invention;

DETAILED DESCRIPTION OF THE PREFERRED EMBODIMENTS

According to the present invention, the connector is composed of an outer housing and an inner housing.

Figure 1A:
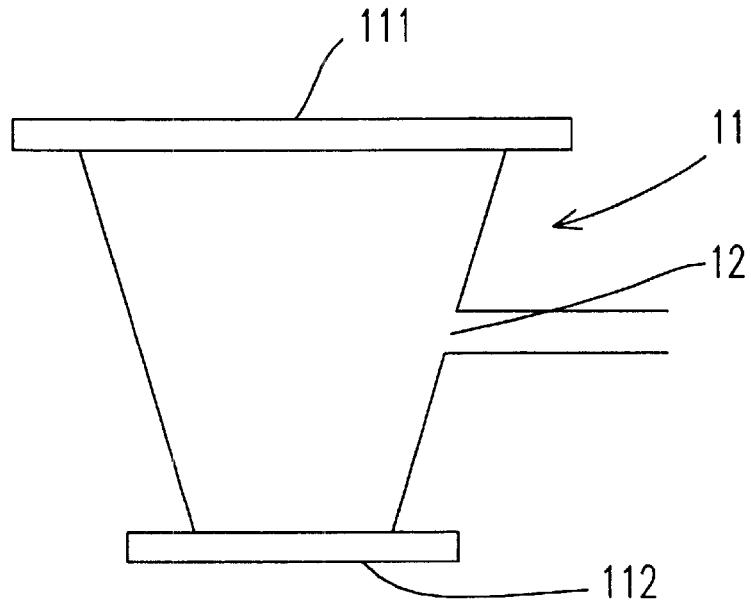
FIG. 1(*a*) is a schematic diagram showing the cross-sectional view of the outer housing of a connector according to the present invention.
Figure 1B:
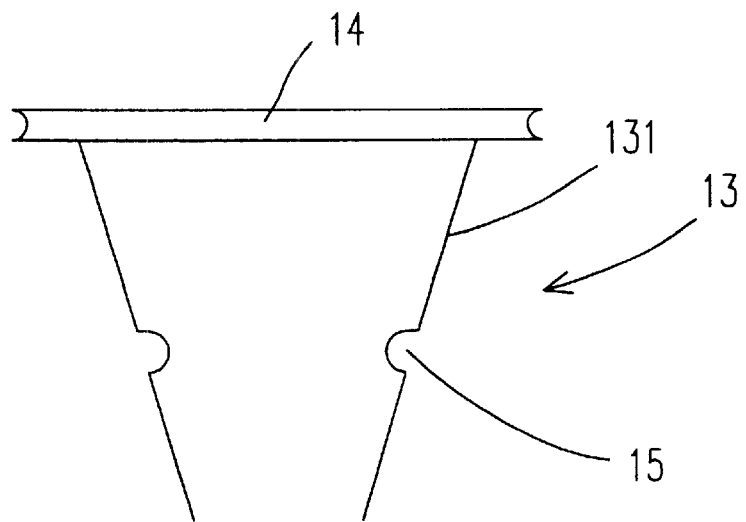
Figure 3:
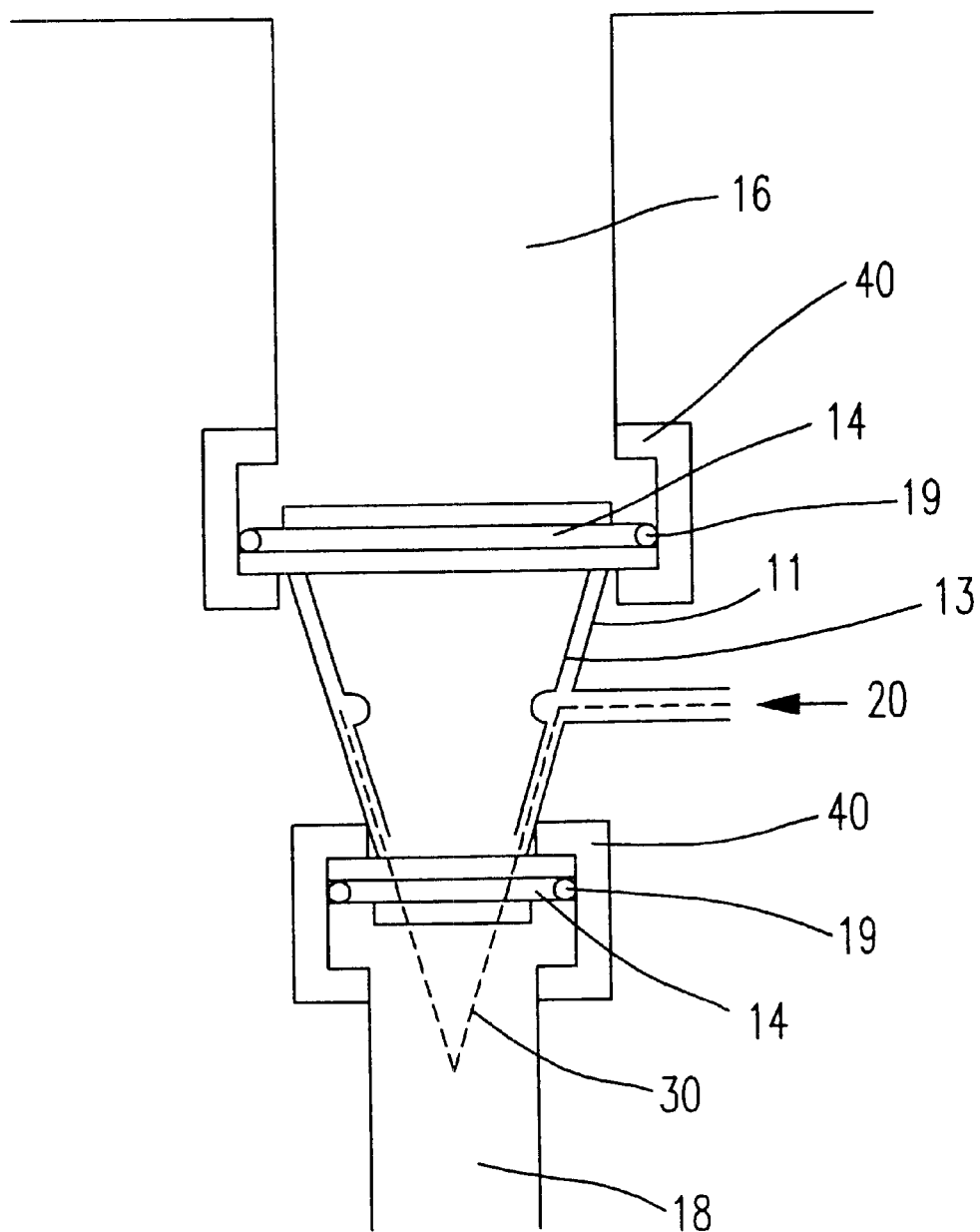
FIG. 3 is a schematic diagram showing an assembled architecture of a connector with the pipes according to the present invention.

Please refer to FIG. 1(*a*) which is a schematic diagram showing the cross-sectional view of the outer housing 11 of a connector according to the present invention. Preferably, the outer housing 11 is in the shape of a funnel. The upper opening 111 and the lower opening 112 are respectively used for connecting with a first pipe 16 and a second pipe 18 (as shown in FIG. 3). Certainly, for connecting the first pipe 16 with the second pipe 18 via the connector, the diameters of the upper opening 111 and the lower opening 112 have to respectively correspond to that of the first pipe 16 and the second pipe 18. A gas inlet 12 is formed on the sidewall of the outer housing 11. An inert gas, preferably nitrogen gas, can be inputted into the connector through the gas inlet 12.

Please refer to FIG. 1(*b*) which is a schematic diagram showing the cross-sectional view of the inner housing 13 of a connector according to the present invention. Preferably, the inner housing 13 is also in the shape of a funnel. To assemble the outer housing 11 and the inner housing 13, the inner housing 13 just have to be pushed into the interior of the outer housing 11. Undoubtedly, the size of the inner housing 13 is smaller than that of the outer housing 11. Preferably, the gap formed between the outer housing 11 and the inner housing 13 is less than 0.2 mm. The inner housing 13 further includes a main body 131 and a center ring 14. An annular concavity 15, corresponding to the gas inlet 12, is formed on the sidewall of the main body 131. The center ring 14 could be integrally formed with the main body 131. Alternatively, the center ring 14 is connected with the main body 131 by soldering. Preferably, the center ring 14 and the main body 131 are made of stainless.

Figure 2:
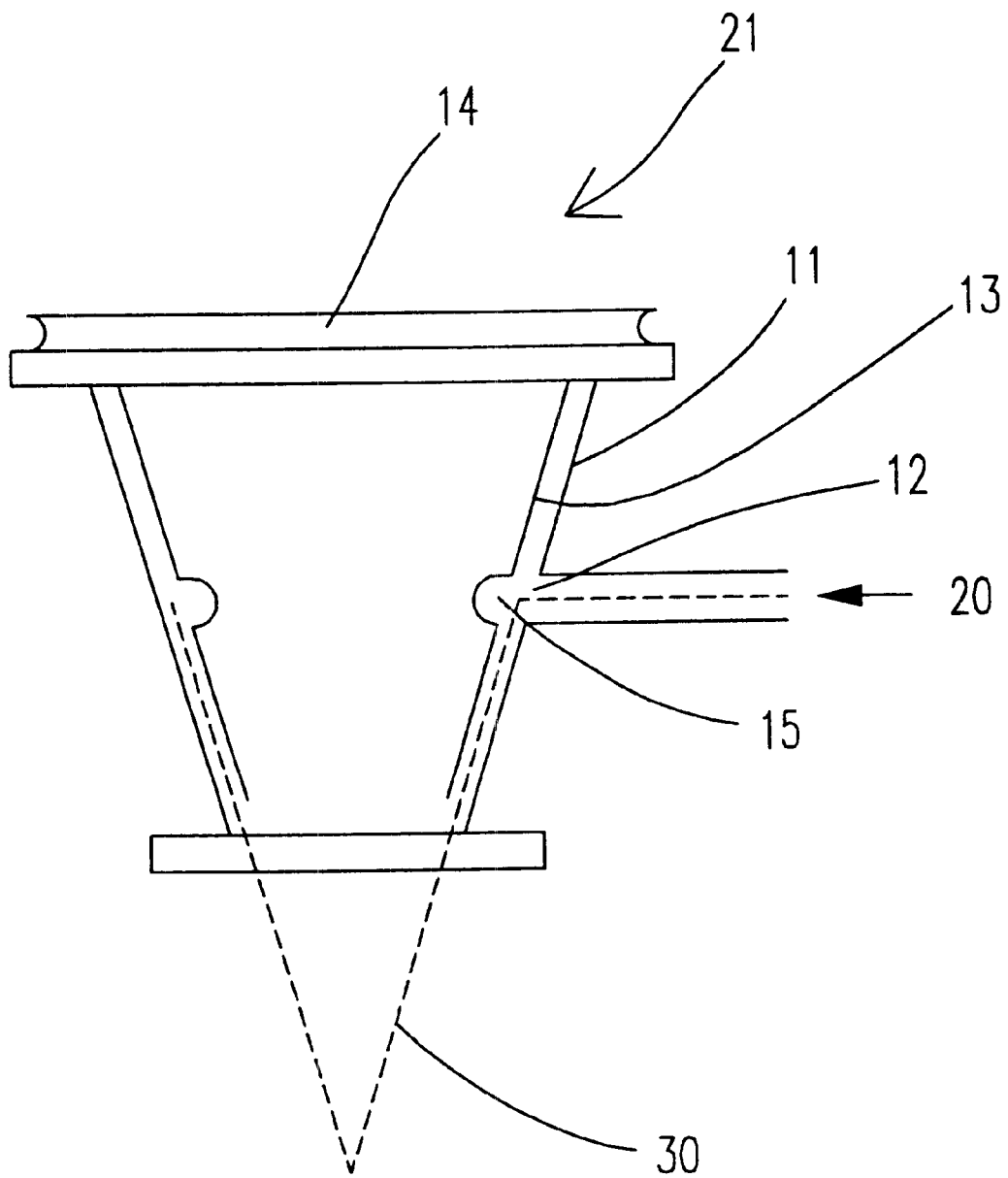
FIG. 2 is a schematic diagram showing the cross-sectional view of a connector according to the present invention.

Please refer to FIG. 2 which is a schematic diagram showing the cross-sectional view of a connector 21 according to the present invention. To assemble the connector 21, the inner housing 13 is pushed into the interior of the outer housing 11 first. Once an inert gas 20 is inputted into the connector 21 through the gas inlet 12, because of the annular concavity 15, the inert gas 20 could be dispersed in the gap formed between the outer housing 11 and the inner housing 13. Thereafter, the inert gas 20 is discharged from the gap and a gas fall 30 is then formed at one end of the connector 21 for prohibiting a gas from flowing back.

Please refer to FIG. 3 which is a schematic diagram showing an assembled architecture of a connector 21 with the pipes according to the present invention. Traditionally, the connector 21 is connected to the first pipe 16 and the second pipe 18 by the center rings 14 and the O-rings 19. The clamps 40 is used for tightly immobilizing the assembled architecture. Preferably, the O-ring is made of viton.

According to the present invention, because of formation of a gas fall 30, the water, the gases or other chemicals contained inside the local scrubber would be prohibited from flowing back. Therefore the incompletely reacted gases and the byproducts removed from the chamber of a chemical vapor deposition machine 17 would not react with the water or other chemicals and then form a depositing layer on the sidewall of the exhaust pipe, i.e. the first pipe 16. The cleaning frequency of the exhaust pipe, i.e. the first pipe 16, is lowered, and the throughputs of the semiconductor products could be raised as well. In addition, because the center ring 14 is integrally formed with the main body 131, it's convenient for the connector 21 to be disassembled for being cleaned.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A connector for prohibiting a gas from flowing back, comprising:

an outer housing having a gas inlet thereon; and an inner housing disposed inside said outer housing and having an annular concavity, corresponding to said gas inlet, thereon.

2. The connector according to claim 1 wherein said gas inlet is used for inputting an inert gas.

3. The connector according to claim 2 wherein said inert gas is nitrogen gas.

4. The connector according to claim 2 wherein said annular concavity is used for dispersing said inputted inert gas.

5. The connector according to claim 1 wherein said outer housing and said inner housing are funnel-shaped.

6. The connector according to claim 5 wherein a gap formed between said outer housing and said inner housing is less than 0.2 mm.

7. The connector according to claim 1 wherein said inner housing further comprises a main body and a center ring.

8. The connector according to claim 7 wherein said center ring is integrally formed with said main body.

9. The connector according to claim 7 wherein said center ring is connected with said main body by soldering.

10. A device for prohibiting a gas from flowing back, comprising:

a first pipe connected to a machine;

a connector connected to said first pipe; and a second pipe connected to said connector, wherein said connector comprises:
    an outer housing having a gas inlet thereon; and
    an inner housing disposed inside said outer housing and having an annular concavity, corresponding to said gas inlet, thereon.

11. The device according to claim 10 wherein said gas inlet is used for inputting an inert gas.

12. The device according to claim 11 wherein said annular concavity is used for dispersing said inputted inert gas.

13. A method of prohibiting a gas from flowing back, adapted to be used for a connector comprising an outer housing and an inner housing, comprising steps of:

(a) inputting an inert gas into a gas inlet of said outer housing;

(b) dispersing said inert gas in a gap formed between said outer housing and said inner housing by an annular concavity of said inner housing; and (c) discharging said inert gas from said gap for forming a gas fall at one end of said connector to prohibit said gas from flowing back.

14. The method according to claim 13 wherein said inert gas is nitrogen gas.

15. The method according to claim 13 wherein said outer housing and said inner housing are funnel-shaped.

16. The method according to claim 13 wherein said gap formed between said outer housing and said inner housing is less than 0.2 mm.

* * * * *